United States Patent Office 3,639,430
Patented Feb. 1, 1972

3,639,430
VAT DYESTUFFS
Hans Altermatt, Reinach, Basel-Land, Switzerland, assignor to Ciba Limited, Basel, Switzerland
No Drawing. Continuation-in-part of application Ser. No. 337,516, Jan. 14, 1964, which is a continuation-in-part of applications Ser. No. 147,139, Oct. 24, 1961, and Ser. No. 216,749, Aug. 14, 1962. This application Jan. 16, 1968, Ser. No. 698,141
Claims priority, application Switzerland, Oct. 28, 1960, 12,112/60
Int. Cl. C09b 1/54, 1/56
U.S. Cl. 260—368         2 Claims

ABSTRACT OF THE DISCLOSURE

New water-soluble vat dyestuffs containing aryloxy- or arylmercapto groups and two anthraquinone radicals or a vattable chromophor containing at least 4 fused rings.

---

This is a continuation-in-part of my application Ser. No. 337,516, filed Jan. 14, 1964, now abandoned, which in turn is a continuation-in-part of my applications Ser. No. 147,139, filed Oct. 24, 1961, now abandoned and Ser. No. 216,749, filed Aug. 14, 1962, now abandoned.

The present invention provides new, valuable vat dyestuffs which contain one, preferably acidic, water-solubilizing group and at least two anthraquinone groups or a vattable system comprising at least 4 fused rings and an arylmercapto or an aryloxy group.

The term "vat dyestuff" includes dyestuffs that can be converted by reduction into a so-called leuco-form or vat, which form has a better affinity for natural or regenerated cellulose fibers than has the un-reduced form, and that can be re-oxidized to the original chromophore system. Suitable vat dyestuffs are especially those of the anthraquinone series, for example those containing two unchanged 9:10-dioxoanthracene rings, or those anthraquinones on to which carbocyclic- and/or heterocyclic rings are condensed, or that comprise a number of anthraquinone units which may be directly bound together or by way of a bridge, or vat dyestuffs of the perylene-tetracarboxylic acid-diimide series, of the naphthalene-tetracarboxylic acid-diimide series or of the benzonaphthoquinone series or indigoid vat dyestuff. There may also be mentioned dyestuffs containing substituents usual in vat dyestuffs such, for example, as halogen atoms, alkoxy-, acylamino- or arylamino groups. Especially interesting are the water-soluble anthraquinone vat dyestuffs of the formula

A—NH—X—NH—A wherein A is anthraquinonyl and X a member selected from the group consisting of the dicarboxylic acids having 2 to 38 carbon atoms and bound to the NH bridges through the —CO— groups of their carboxyl groups, and the 1:3:5-triazines bound to the —NH— bridges by the carbon atoms in 2- and 4-position of the triazine ring, at least one of the anthraquinone radicals A bearing a member selected from the group consisting of the sulfophenoxy, the sulfonaphthyloxy, the carboxyphenyloxy, the sulfoethylmercapto, the sulfobenzyloxy, the sulfobenzylmercapto, the sulfatoethylmercapto, the sulfophenylmercapto, the carboxyphenylmercapto, the carboxymethylmercapto and the sulfonaphthylmercapto substituents. In addition to the said group the anthraquinone radicals A may contain substituents that are usual in vat dyestuffs, for example, halogen atoms, alkoxy groups or alkyl groups, sulfone, sulfonamide groups, acyl groups and above all acylamino groups, such as the acetylamino and especially aroylamino groups, for examples, naphthoylamino or benzoylamino groups such as the chloro-, methyl-, methoxybenzyl-, phenoxy-, phenyl-, thio-, trifluoromethyl- or phenyl-benzoylamino groups.

One or both radicals A may also contain one or more heterocyclic or carbocyclic fused rings; thus at least one of the radicals A may be an anthraquinoneacridone or a pyranthrone, anthanthrone, dibenzpyrenequinone or acedianthrone radical and also an anthrapyrimidine or a pyrazolanthrone radical.

The dyestuffs of the invention are prepared by introduction of a mercapto or an aryloxy group into a vat dyestuff and, if desired, at the same time introduction of a water-solubilizing group should such a group not already be present in the vat dyestuff used as starting material, or by introduction of at least one acidic water-solubilizing group, for example a sulfate- or sulfonic acid radical, into a vat dyestuff comprising at least two anthraquinone radicals or a vattable system comprising at least 4 condensed rings and one aryloxy group or one, if desired substituted, hydrocarbon radical bound through a sulfur atom, the radical being, for example, an alkyl-, cycloalkyl-, aralkyl- or above all an aryl group.

Especially valuable are the products obtained by sulfonating at room temperature with oleum of 1 to 10% free sulfur trioxide an anthraquinone dyestuff of the formula

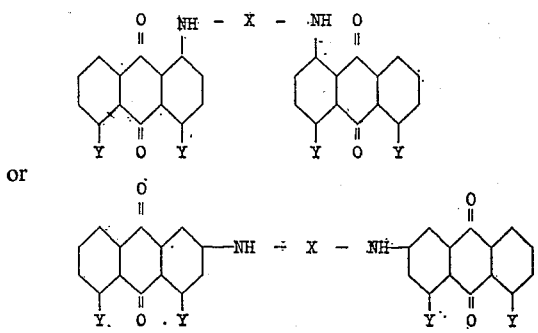

or wherein at least one and at most two of the symbols Y are for a phenoxy-, naphthoxy-, benzyloxy-, benzylmercapto-, phenylmercapto- or naphthylmercapto group, the other being for hydrogen and X is a member selected from the group consisting of the 1:3:5-triazines bound to the two NH-bridges by the carbon atoms in 2 and 4 position to the triazine ring, the lower aliphatic dicarboxylic acids bound to the two NH-bridges by their —CO— groups, the benzene and naphthalene dicarboxylic acids bound to the two NH-bridges by their —CO— groups, the diphenyl-, diphenylsulfide, diphenylsulfone, two NH-bridges by their —CO— groups, the 2,6-pyridine dicarboxylic acid bound to the two NH-bridges by its CO— groups, the 2,5-thiophene and 2,5-diphenylthiophene dicarboxylic acids bound to the two NH-bridges by their CO— groups, the diphenyloxide dicarboxylic acids bound to the two NH-bridges by its —CO— groups, the azobenzene and azo-diphenyldicarboxylic acid bound to the two NH-bridges by their —CO— groups, the perylenetetracarboxylic-acid N,N-diphenylimide dicarboxylic acid bound to the two NH-bridges by its CO— groups, the radical of the formula

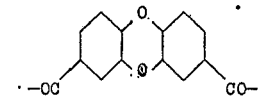

and the radical of the formula

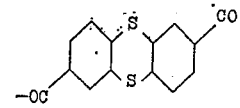

both also bound to the NH-bridges by their —CO— groups.

The process of preparation can be carried out, for example, by acylation and the simultaneous, prior or subsequent introduction of one or several water-solubilizing groups such, for example, as the sulfate-, carboxylic acid- and/or sulfonic acid groups. Thus, for example, two amino-anthraquinones having a sulfo- or carboxyarylmercapto, a sulfo- or carboxyaryloxy or a sulfomethyl- or sulfoethylmercapto group may be transformed into a dyestuff of the formula A—NH—X—NH—A by acylation with heterocyclic acid halide or with a polycarboxylic acid halide or anhydride, preferably one having two carbon atoms (as oxalic acid) or more up to 38 carbon atoms (as in the perylenetetracarboxylic acid-di-(carboxyphenyl)-imide).

As suitable acylating agents of this kind there may be mentioned the halides of aliphatic or preferably aromatic polybasic acids, such, for example, as of oxalic acid, succinic acid, glutaric acid, phthalic acid, iso- and terephthalic acids, azobenzene-dicarboxylic acid, azo-diphenyl-dicarboxylic acid, perylene-tetracarboxylic acid-dianilide - dicarboxylic acid, anthanthrone-dicarboxylic acid, furane- and thiophene-carboxylic acid-sulfonic acids, thiophen-dicarboxylic acid and especially the halides of barbituric and cyanuric acids or condensation products thereof the use of which leads directly to the valuable products of the invention that contain two arylmercapto-anthraquinone radicals. Of the last-mentioned type of acylating agent, there may be mentioned for example, cyanuric chloride and its mon-condensation products with an alcohol, phenol, mercaptan, ammonia or an amine, especially a sulfo-arylamine, with or without a dyestuff characteristic, or 2:4:6-trichloropyrimidine,
2:4:6-tribrompyrimidine,
2:4:5:6-tetrachloropyrimidine,
2:4-dichloro-6-methylpyrimidine,
2:4-dichloro-5-nitropyrimidine,
2:4-dichloro-5-nitro-6-methylpyrimidine,
2:4:6-trichloro-5-nitropyrimidine,
2:6-dichloropyrimidine-4-carboxylic acid-chloride,
2:6-dichloropyrimidine-5-sulfonic acid-chloride,
2:4-dichloropyrimidine-5-sulfonic acid,
2-(3'- or 4'-carboxyphenylamino)-4,6-dichloropyrimidine,
2-(3'- or 4'-carboxyphenylamino)-4:6:5-trichloropyrimidine, or a compound of the formula

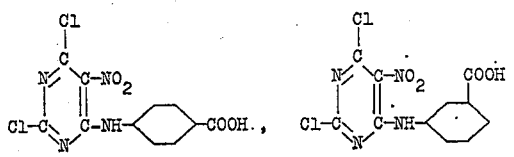

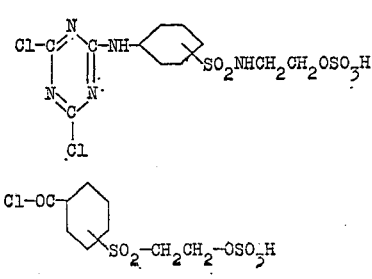

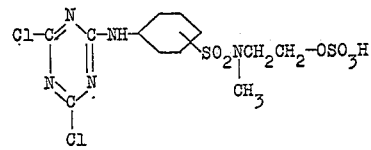

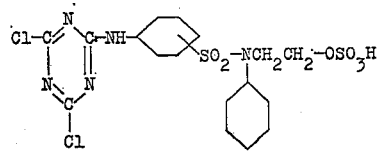

or corresponding chlorides containing, instead of the dichlorotriazine radical, a di- or trichlorpyrimidine radical, or compounds of the formula

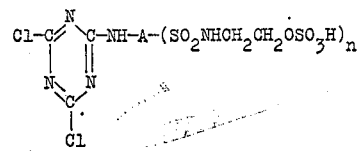

in which A is an anthraquinone radical or the radical of a polycyclic quinone, and $n=1, 2, 3$ or $4$.

The acylation with one of the above-mentioned acylating agents that contain a dichlorotriazine ring, may be carried out by first reacting cyanuric chloride with a phenyloxy- or phenyl-mercaptoanthraquinone derivative containing an acylatable amino group in the molar ratio of 1:1, and reacting the dichlorotriazine-condensation product so obtained with another molecule of the same or of a different aminoanthraquinone or with one molecular proportion of a compound of the formula $$H_2N—A—(SO_2NHCH_2CH_2—S—SO_3H)_n$$

or $$H_2N—A—(SO_2NHCH_2CH_2OSO_3H)_n$$

in which A and $n$ have the meanings given above.

Suitable acylatable vat dyestuffs or vat dyestuff intermediates which are convertible into vat dyestuffs by acylation, are those containing an alkyl-, cycloalkyl-, aralkyl- or above all aryl group bound through an oxygen or a sulfur atom as defined above. As starting materials of this kind there may be mentioned 2-aminoanthraquinones or above all 1-aminoanthraquinones that contain a monoalkylated or especially a free NH₂— group and, for example in the 3-, 4-, 5-, 6-, 7- or 8-position, an alkylmercapto-, alkylsulfone-, arylsulfone- or, above all, an aryloxy or an arylmercapto group, which may, if desired, contain a water-solubilizing group.

As such a group there may be mentioned for example the naphthoxy group (including α- and β-naphthoxy groups), the phenoxy groups (such as chlorophenoxy, ortho-, meta-, or para-methylphenoxy, sulfophenoxy, carboxyphenoxy), the napthylmercapto and the phenylmercapto groups such as the chlorophenylmercapto, o-, m- or p-methylphenylmercapto, phenoxyphenylmercapto, benzylphenylmercapto diphenylmercapto, sulfophenylmercapto and carboxylphenylmercapto groups. The following compounds containing such groups may, for example, be mentioned:

1-amino-4-(4'-methyl- or 4'-chloromethyl-phenylmercapto)-anthraquinone,
1-amino - 5 - (4'-methyl- or 3'-chlorophenylmercapto)-anthraquinone,
1-methylamino - 4 - (4'-chloromethyl)-phenylmercapto)-anthraquinone,
1:4-diamino-2:3-di-(phenylmercapto)-anthraquinone,
1-amino-4-phenylmercapto-anthraquinone, 2-amino-6-phenylmercapto-anthraquinone,
1-amino-5-phenylmercapto-anthraquinone,
1-amino-6-phenylmercapto-anthraquinone,
1-amino-8-phenylmercapto-anthraquinone,
1-amino-7-phenylmercapto-anthraquinone,
1-amino-4- or -5-(α- or β-naphthylmercapto)-anthraquinone,
1-amino-4- or -5-(8' - chloronaphthyl(1') - mercapto)-anthraquinone,
1:5-diamino-4-phenylmercapto-anthraquinone,
1:4-diamino-5-phenylmercapto-anthraquinone,
1:5-diamino-4:8-diphenylmercapto-anthraquinone, as well as derivatives of these compounds containing a sulfonic acid group in the anthraquinone- and/or phenylmercapto group, for example, the 1-amino-4-, -5- or -8-phenylmercapto-anthraquinone-3'- or -4'-sulfonic acid, or the 1-amino-4-, -5- or -8-phenylmercapto-anthraquinone-3'-carboxylic acid and also the following aryloxy-aminoanthraquinones:

1 - amino - 4 - (4'-methyl- or 4'-chloromethylphenoxy)-anthraquinone,
1-amino-5-(4'-methyl- or 3'-chlorophenoxy) - anthraquinone,
1:4-diamino-2:3-di(phenoxy)-anthraquinone,
1-amino-4-phenoxyanthraquinone,
2-amino-6-phenoxyanthraquinone,
1-amino-5-phenoxyanthraquinone,
1-amino-6-phenoxyanthraquinone,
1-amino-8-phenoxyanthraquinone,
1-amino-7-phenoxyanthraquinone,
1-amino-4- or -5-(α- or β-naphthoxy)-anthraquinone,
1-amino-4- or -5-[8'-chloronaphth-(1')-oxy] - anthraquinone,
1:5-diamino-4-phenoxyanthraquinone,
1:4-diamino-5-phenoxyanthraquinone, and
1:5-diamino-4:8-diphenoxyanthraquinone, and also corresponding derivatives with sulfonic acid groups in the phenoxy or naphthoxy residue, such as 1-amino-4-, -5- or -8-phenoxyanthraquinone-3'- or -4'-sulfonic acid, and 1-amino-4-, -5- or 8-phenoxyanthraquinone-2'-carboxylic acid.

The named compounds which contain carboxy or sulfo groups when condensed with one of the said acylating agents for example, one of the dicarboxylic acid-halides or amino-dichlorotriazines mentioned above, yield directly the dyestuff of the formula A—NH—X—NH—A.

The acylation with one of the above-mentioned acylating agents that contain a dichlorotriazine ring, may also be carried out by first reacting cyanuric chloride with a phenyl-mercaptoanthraquinone derivative containing an acylatable amino group in the molar ratio of 1:1, and reacting the dichlorotriazine-condensation product so obtained with a further aminoanthraquinone that may be different and may also be free from arylmercapto groups.

According to the invention, the reaction between the above-mentioned acylating agent with the phenylmercapto-anthraquinone that contains an amino group, can be carried out in an inert organic solvent, for example, nitrobenzene, chlorobenzene or ortho-dichlorobenzene, at a raised temperature. In many cases, the reaction can be carried out in an aqueous medium, advantageously in the presence of an acid-binding agent such, for example, as sodium acetate, sodium hydroxide or sodium carbonate. The starting materials are so chosen that the products obtained contain at least one acidic water-solubilizing group, for example, a sulfate-, sulfonic acid- or carboxyl group. When the starting material used is free from sulfonic acid- or carboxyl groups, one or several acidic water-solubilizing groups must be introduced into the vat dyestuff obtained, after the acylation. This introduction can be carried out in a number of ways. If, for example, the acylated dyestuff contains an easily removable substituent, e.g. a halogen atom, in a triazine radical, or contains a sulfonic acid-halide group, such a substituent can, by treatment with a carboxyl-, sulfonic- or sulfateamine or with a carboxyphenol or sulfophenol, be replaced by a water-solubilizing group, in a very simple manner.

The introduction of the group imparting solubility in water can be carried out in a direct manner, for example, by sulfation of a vat dyestuff containing an aryloxy or an arylmercapto group with oleum or concentrated sulfuric acid, either in the cold or at a raised temperature. Advantageously the sulfonation is carried out with oleum of 1 to 10% free sulfur trioxide.

The vat dyestuffs of the invention are suitable for dyeing a vary wide variety of materials, such as synthetic or natural fibers, for example, cellulose ethers and esters, polyester fibers (Terylene or Dacron), polyamide fibers (nylon, etc.), polyacrylonitrile fibers (Orlon), and polyurethane fibers, and also wool and silk, but more especially they are suitable for dyeing or printing textile materials of natural or regenerated cellulose, dyeing being carried out by the so-called direct or exhaustion method or by padding.

The compounds of the invention that contain a substituent that reacts with the fiber can be fixed on wool or cellulose to give a fast dyeing, and the sulfoaryloxyanthraquinones with a low molecular weight yield valuable dyeings and prints especially on wool, silk and polyamides.

Northwithstanding their solubility in water, the vat dyestuffs of the invention that contain at least 4 fused rings or at least two anthraquinone nuclei yield on cellulosic fibers when applied by the vat dyeing method, that is to say, in the presence of an alkali and a reducing agent, dyeings and prints that are distinguished by their very good fastness to light, chlorine and wet treatments, especially by their excellent fastness to soda boiling and, as a rule, by their good levelness and good dyestuff penetration.

The dyeings and prints so obtained are also fast to dry cleaning and migration. The dyed fabrics can therefore be coated with synthetic resins, for example, polyvinyl chloride, without the dyestuff migrating into the resin, which is particularly important in the manufacture of artificial leather. Furthermore, there may also be mentioned the ease with which the compounds of the invention can be vatted, which makes for economy and simplicity of application.

As compared with the conventional vat dyestuffs, the vat dyestuffs of the invention have a better levelling and penetrating power. When used for dyeings in circulating liquor machines they do not give rise to faulty dyeings caused by the precipitation of reoxidized dyestuff even when foam is formed, and the pigmenting operation that is necessary in dyeing wound packages, for example, cheeses, or in dyeing tricots on a winch machine, with the conventional vat dyestuff, is omitted in the case of the dyestuffs of the invention. They can also be used in the form of solutions in the fast-running pad-dyeing processes and, in this case they do not have to be in a finely dispersed commercial form or in the form of special pastes, so that the disadvantages of such forms (instability of the paste, dusting, and need for several operations to prepare finely divided powder) are eliminated. Finally, they can generally be vatted very easily, often at room temperature and, if required, with mild reducing agents. They possess a very good solubility in the vat, and yield strong and very level dyeings especially on regenerated cellulose that exhibit the same tint as the corresponding dyeings on cotton.

Unless otherwise stated, the parts and percentages in the following examples are by weight, and the relationship of parts by weight to parts by volume is the same as that of the gram to the milliliter.

EXAMPLE 1

331 parts of 1-amino-5-phenylmercapto-anthraquinone are stirred with 92 parts of cyanuric chloride and 1 part of pyridine in 3000 parts by volume of dry nitrobenzene for 3 hours at 160° C. It is then stirred for ½ hour under reflux. The bright orange condensation product already separates out from the warm mixture. This is cooled, filtered, washed thoroughly with a small amount of nitrobenzene followed by methanol, and then dried at 70° C. under vacuum.

10 parts of the condensation prodct so obtained are added at 10° C. to 70 parts by volume of oleum containing 1% of free $SO_3$. After a short time, a sample is soluble in dilute sodium hydroxide solution. The sulfuric acid solution is poured into 300 parts of ice, then filtered, and the residue is washed with a small amount of water and then dissolved in dilute sodium hydroxide solution. By salting out, the solution yields the disulfonate of the probable formula

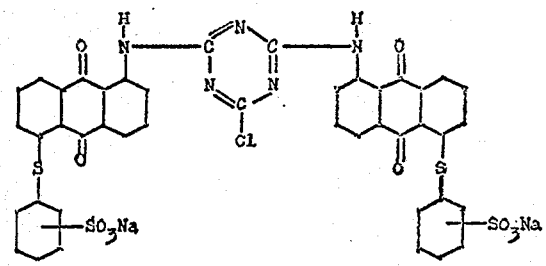

This dyestuff dyes cotton by the dyeing Process A, bright, golden-yellow tints of excellent properties of fastness.

By using the amounts given in Colum II of the anthraquinones given in Column I of the following table, instead of the 331 parts of 1-amino-5-phenylmercapto-anthraquinone, after a similar sulfonation, analogous dyestuffs are obtained. The dyeing obtained by following the dyeing Process A yields the tint given in Column III.

| | II | III |
|---|---|---|
| 1-amino-4-phenylmercaptoanthraquinone | 331 | Red. |
| 1-amino-6-phenylmercaptoanthraquinone | 331 | Yellow. |
| 1-amino-7-phenylmercaptoanthraquinone | 331 | Do. |
| 1-amino-8-phenylmercaptoanthraquinone | 331 | Do. |
| 2-amino-5-phenylmercaptoanthraquinone | 331 | Do. |
| 2-amino-6-phenylmercaptoanthraquinone | 331 | Do. |
| 1-amino-5-(p-methylphenylmercapto)-anthraquinone. | 345 | Orange yellow. |
| 1-amino-5-(3-chlorophenylmercapto)-anthraquinone. | 365 | Yellow. |
| 1-amino-4-(1-naphthylmercapto)-anthraquinone | 381 | Red. |
| 1-amino-4-(2-naphthylmercapto)-anthraquinone | 381 | Red. |
| 1-amino-5-(2-naphthylmercapto)-anthraquinone | 381 | Yellow. |
| 1-amino-5-(8-chloro-1-naphthylmercapto)-anthraquinone. | 415 | Do. |
| 1-amino-5-benzylmercaptoanthraquinone | 345 | Do. |
| 1-amino-6-chloro-7-phenylmercaptoanthraquinone | 365 | Do. |
| 1-amino-2-bromo-4-phenylmercaptoanthraquinone | 410 | Red. |
| 1-amino-6-methyl-4-phenylmercaptoanthraquinone | 345 | Red. |
| 1-amino-2,4-dibromo-5-phenylmercaptoanthraquinone. | 490 | Golden yellow. |

EXAMPLE 2

40 parts of the dyestuff of formula

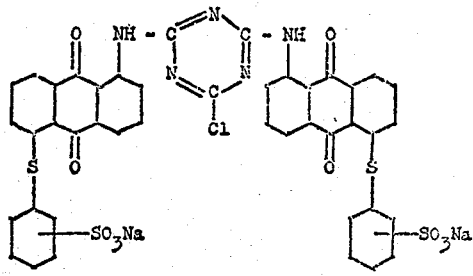

(obtained by reacting 1 molecular proportion of cyanuryl chloride with 2 molecular proportions of 1-amino-5-phenylmercapto-anthraquinone, followed by sulfonation in oleum containing 1% of free $SO_3$) are dissolved in 2000 parts by volume of water and the solution is adjusted to a pH-value of 10.9 with 50 parts by volume of a normal solution of sodium hydroxide. It is stirred for 6 hours at a temperature within the range of 70–75° C., and the excess sodium hydroxide is then neutralized. By salting out, the unreactive, water-soluble dyestuff of the formula

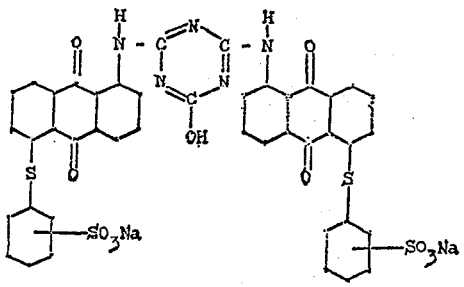

is obtained in quantitative yield.

By following the dyeing Process A, this dyestuff dyes cotton brilliant yellow tints of excellent fastness to light and excellent wet fastness. Under the same conditions, the dyestuffs given in the table of Example 1 can be hydrolyzed to yield corresponding, non-reactive, but water-soluble vat dyestuffs which can be used e.g. according to the Process A.

EXAMPLE 3

103 parts of 1-amino-6-chloro-anthraquinone in 1400 parts by volume of nitrobenzene and 1 part by volume of pyridine are stirred at 160° C. for ½ hour, under reflux with 36.8 parts of cyanuryl chloride. After cooling and filtering, the residue is washed with a small amount of nitrobenzene and then with methanol, and finally dried.

20.9 parts of the dyestuff so obtained are stirred for 15 hours under reflux, with 11 parts of thiophenol, 7 parts of potassium carbonate and 300 parts by volume of amyl alcohol. After cooling and filtering, the residue is thoroughly washed first with methanol and then with water and finally dried at 90° C. under vacuum.

10 parts of the mercaptan so obtained are added at room temperature to 80 parts by volume of oleum containing 5% of free $SO_3$, and then stirred for 1 hour. The mixture is then pourred into ice, filtered and washed. The residue is dissolved in a dilute solution of sodium hydroxide, and then salted out with sodium chloride. The dyestuff so obtained probably has the formula

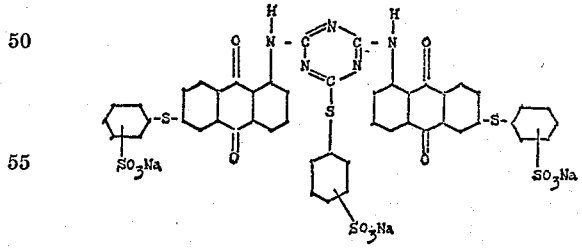

and dyes cotton by the dyeing Process A bright yellow tints of excellent properties of fastness.

EXAMPLE 4

3 parts of the dyestuff described in the first part of Example 1 are stirred for 20 hours under reflux, with 2 parts of aniline in 100 parts by volume of ortho-dichlorobenzene in the presence of 0.1 part of pyridine. After cooling and filtering, the residue is washed with methanol and then with water, and finally dried under vacuum.

10 parts of the dyestuff so obtained are added to 80 parts by volume of oleum containing 5% of free $SO_3$, at room temperature. As soon as a neutralized sample is soluble in water, the whole is poured into ice and then filtered. The residue is dissolved in a dilute solution of sodium hydroxide, and the dyestuff probably corresponding to the formula

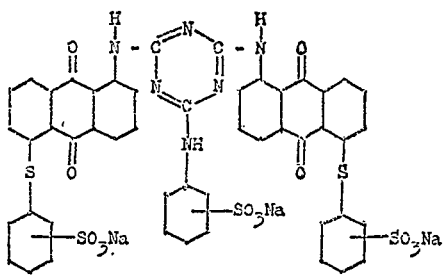

can be salted out. This dyestuff dyes cotton by the dyeing Process A bright golden-yellow tints.

EXAMPLE 5

66.2 parts of 1-amino-5-phenylmercapto-anthraquinone are stirred for 3 hours at 160° C. in 700 parts by volume of dry nitrobenzene, in the presence of 1 part of pyridine, with 22.6 parts of 2:4-dichloro-6-phenyl-1:3:5-triazine, and then stirred under reflux for a further ¼ hour. After cooling, the orange-yellow dyestuff of the formula

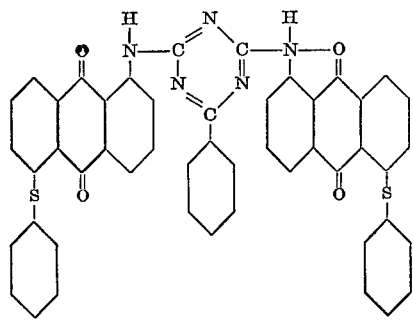

is isolated, thoroughly washed with methanol and then dried at 70° C. under vacuum.

10 parts of the dyestuff so obtained are added with good stirring, at room temperature, to 75 parts by volume of oleum containing 1% fo free $SO_3$. As soon as a sample is soluble in a dilute solution of sodium hydroxide, the whole is poured into 400 parts of ice and then filtered. The residue is washed, and then dissolved in a dilute solution of sodium hydroxide. The now water-soluble dyestuff is isolated by salting out. The dyestuff yields yellow tints of excellent properties of fastness, when used according to the dyeing Process A.

By using 24.2 parts of 2:4-dichloro-6-phenylamino-1:3:5-triazine instead of the phenyl-dichlorotriazine, and similarly sulfonating the dyestuff of the formula

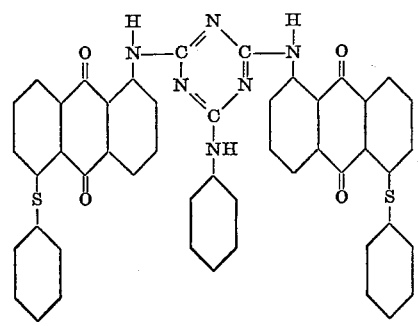

there is obtained a yellow, water-soluble vat dyestuff and it dyes cotton e.g. by the dyeing Process A golden-yellow tints.

EXAMPLE 6

66.2 parts of 1-amino-5-phenylmercapto-anthraquinone in 600 parts by volume of dry nitrobenzene containing 1 part of pyridine are stirred for 3 hours at 160° C., with 29.2 parts of 2:4-dichloro-6-(2'-hydroxynaphthyl-1')-triazine-1:3:5, and then stirred for a further ½ hour under reflux. After cooling, it is filtered and the reddish-yellow dyestuff of the formula

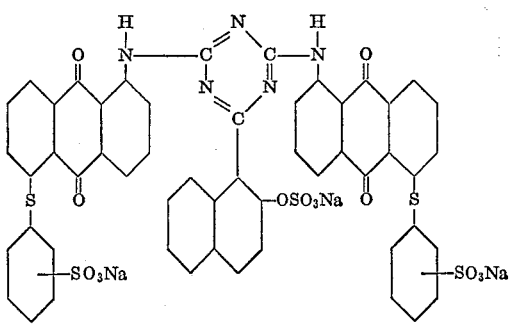

is thoroughly washed with methanol and then dried at 70° C. under vacuum.

10 parts of the dry dyestuff so obtained are added at room temperature to 75 parts of oleum containing 1% of free $SO_3$, with good stirring. As soon as a sample is soluble in a dilute solution of sodium hydroxide, the mixture is added to 400 parts of ice, filtered, and then washed with a small amount of water. The filter residue is dissolved in a dilute solution of sodium hydroxide and filtered. By salting out, a yellow dyestuff that presumably has the formula can be obtained from the filtrate. It dyes cotton by the dyeing Process A, bright-yellow tints of very good properties of fastness.

EXAMPLE 7

76.2 parts of 1-amino-6-(β-naphthylmercapto)-anthraquinone, 29.2 parts of 2:4-dichloro-6-[2'-hydroxynaphthyl-(1')]-triazine-1:3:5, and 1 part of pyridine are stirred for three hours at 160° C. in 600 parts by volume of dry nitrobenzene, and then stirred for a further ¼ hour under reflux. After cooling, the orange-yellow dyestuff is isolated, thoroughly washed with ethanol, and then dried at 60° C. under vacuum.

10 parts of the dry dyestuff so obtained are strewn into 75 parts by volume of oleum containing 1% of free $SO_3$, at room temperature and with good stirring. As soon as a neutralized sample is soluble in water, which is the case after about ¼ hour, the whole mixture is poured into 400 parts of ice. The precipitate is filtered, washed with a small amount of water, and then stirred for ½ hour in 500 parts by volume of a 2-normal solution of sodium hydroxide, at 80° C. After cooling, the water-soluble dyestuff, that probably has the formula

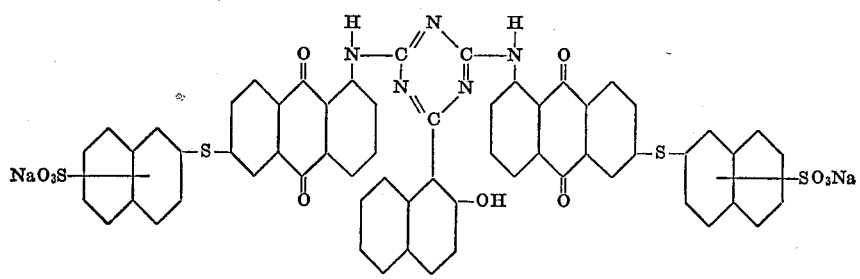

can be salted out. It dyes cotton by the dyeing Process A, yellow tints.

EXAMPLE 8

331 parts of 1-amino-5-phenylmercapto-anthraquinone are stirred in 2000 parts by volume of trichlorobenzene, 5 parts by volume of thionyl chloride and 2 parts by volume of pyridine, with 102 parts of isophthalic acid-dichloride for 3 hours at 150° C. After cooling, the dyestuff is filtered, thoroughly washed with methanol and then dried at 70° C. under vacuum.

10 parts of the dry dyestuff are added to 50 parts by volume of oleum containing 5% of free $SO_3$, at room temperature. As soon as a neutralized sample is soluble in water, the whole is poured into 300 parts of ice. The precipitate is filtered, slurried in an excess of dilute sodium hydroxide solution and, after salting out, filtered. The dyestuff so obtained corresponds to the formula

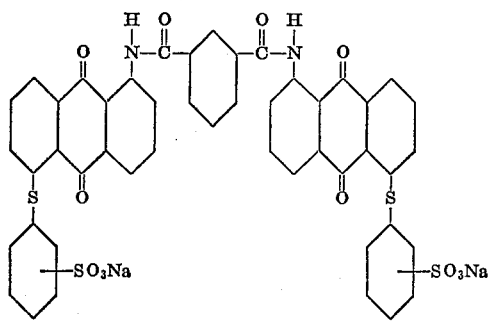

and dyes cotton by the dyeing Process A, yellow tints of excellent properties of fastness.

By using the quantities given in Column II of the dicarboxylic acid dichlorides given in Column I of the following table, instead of the 102 parts of isophthalic chloride, and then sulfonating by stirring in weak oleum, analogous dyestuffs are obtained, which can be used for dyeing, for example, in the dyeing Process A.

| I, dicarboxylic acid dichloride | II parts |
|---|---|
| Cl—CO—CO—Cl | 63.5 |
| Cl—CO—CH₂—CH₂—CO—Cl | 77.5 |
| Cl—CO—C≡C—CO—Cl | 75.5 |
| Cl—CO—⟨⟩—CO—Cl | 102 |
| (naphthalene dicarbonyl chloride) | 126 |
| biphenyl-CO-Cl | 140 |
| diphenyl sulfide-CO-Cl | 156 |
| (ArSO₂Ar)—CO—Cl | 172 |
| (ArCH₂Ar)—CO—Cl | 147 |
| (ArNHAr)—CO—Cl | 148 |
| azo diphenyl dicarbonyl chloride | 153 |
| extended azo dicarbonyl chloride | 229 |
| oxadiazole dicarbonyl chloride | 217 |
| thiophene dicarbonyl chloride | 158 |
| pyridine dicarbonyl chloride | 146 |
| thianthrene dicarbonyl chloride | 170 |
| Cl—CO—CH₂—S—Ar—S—CH₂—CO—Cl | 147 |
| anthraquinone-thio-phenyl CO—Cl | 282 |

The anthraquinones given in Column I of the table in Example 1 can be used in the amounts shown in Column II, instead of the 331 parts of 1-amino-5-phenylmercapto-anthraquinone.

The formation of the acid-chlorides can be carried out in the same reaction vessel, that is to say, without first being isolated, in the manner described in Example 9.

EXAMPLE 9

34 parts of 2:5-thiophene-dicarboxylic acid are stirred for ½ hour, at 120° C., with 32 parts by volume of thionyl chloride in 650 parts by volume of dry nitrobenzene in the presence of 0.1 part of pyridine. The mixture is then cooled to 80° C., 132 parts of 1-amino-5-phenyl-mercapto-anthraquinone are added and stirring is continued for 2 hours at 135° C. After cooling, the mixture is filtered, and the yellow-orange dyestuff is washed with methanol. The dyestuff is then sulfonated in the manner described in Example 8.

EXAMPLE 10

12.6 parts of the dicondensation product of perylene-3:4:9:10-tetracarboxylic acid and 1-aminobenzene-3-carboxylic acid are finely pulverized, suspended in 150 parts of dry nitrobenzene, and then treated with 12 parts of thionyl chloride and 0.5 part of pyridine. The mixture is heated for 2 hours at a temperature within the range of 95–100° C., with good stirring, then for 1 hour at a temperature within the range of 130–135° C. and finally for ½ hour at a temperature within the range of 170–175° C. The excess thionyl chloride is then distilled off at 120° C. under vacuum, and then 16 parts of 1-amino-5-phenyl-mercaptoanthraquinone are added to the reaction mixture. The condensation is conducted first for 3 hours at a temperature within the range of 120–125° C., then for a further 3 hours at a temperature within the range of 140–145° C., and finally for a further hour at 170° C. After cooling to room temperature, the material is filtered, washed first with nitrobenzene and then with methanol, and finally dried at 90° C. under vacuum.

24 parts of the condensation product so obtained are added to 400 parts of 2% oleum at a temperature within the range of 4–8° C., and then stirred for 1 hour. The solution is poured into ice, and the dyestuff acid is isolated by filtration and then washed with water. The filter-cake is slurried in water and adjusted to a pH-value of 8 by means of a solution of sodium hydroxide. The dyestuff is isolated in the usual manner and dried at 80° C. under vacuum.

The dyestuff is obtained as a reddish brown powder which gives a clear solution in water and dyes cotton and regenerated cellulose in reddish blue vats by the usual vat dyeing process, with scarlet-red tints that have very good wet fastness and excellent powers of penetration. The dyestuff probably has the formula

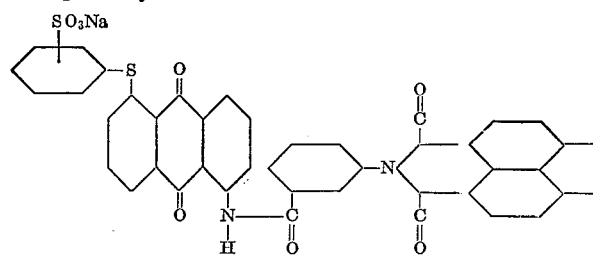

By using 16 parts of 1-amino-4-phenylmercaptoanthraquinone instead of the 16 parts of 1-amino-5-phenylmercapto-anthraquinone, a dyestuff is obtained that dyes cotton more bluish-red tints.

EXAMPLE 11

6.6 parts of 1-amino-5-phenylmercapto-anthraquinone are stirred in 30 parts by volume of N-methyl-pyrrolidone with 5.5 parts of 2:4-dichloro-6-phenyl-triazine-1:3:5, for 1 hour at 100° C. After cooling, it is filtered and the dyestuff of the formula

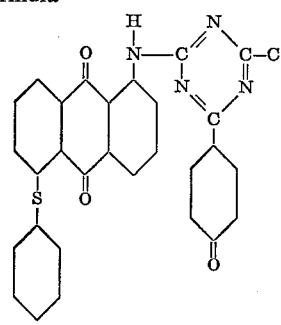

so obtained is well washed with methanol, and then dried at 60° C. under vacuum.

7.8 parts of this dyestuff and 5.1 parts of 4-amino-anthraquinone - 1(N)-2-benzacridone are stirred in 150 parts of dry nitrobenzene, in the presence of 0.2 part of pyridine, for 4 hours at 190° C. After cooling, the nitrobenzene is removed and the green dyestuff of the formula

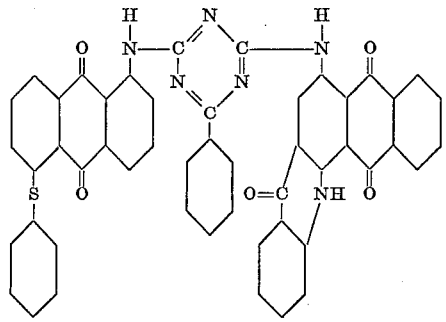

obtained is dried at 60° C. under vacuum.

5 parts of the dry dyestuff are added to 30 parts by volume of oleum containing 5% of free $SO_3$, with good stirring. After 1 hour, the material is poured into 200 parts of ice, then filtered, and the residue is washed with a small amount of water. After neutralization, the water-soluble, olive-green dyestuff is dried under vacuum. It dyes cotton by the dyeing Process A, olive-green tints.

EXAMPLE 12

43 parts of 2:5-thiophene-dicarboxylic acid are stirred with 150 parts by volume of thionyl chloride in 2000 parts by volume of trichlorobenzene in the presence of 0.5 part of pyridine, for ½ hour, at 130° C. The excess thionyl chloride is distilled off, and 83 parts of 1-amino-5-phenylmercapto-anthraquinone are then added to the acid-chloride solution, which is then stirred for 1½ hours at 160° C. 63 parts of 1-amino-4-methoxy-anthraquinone are introduced and the mass stirred at 160° C. for 2½ hours. After cooling, the dark red dyestuff is filtered,

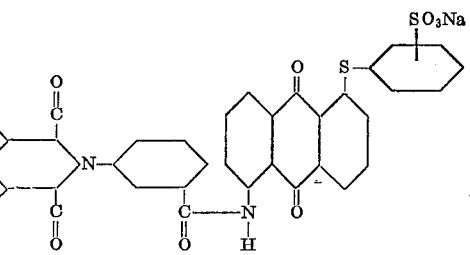

thoroughly washed with a small amount of trichlorobenzene and then with methanol, and finally dried at 70° C. under vacuum.

10 parts of the dry dyestuff are stirred into 60 parts by volume of oleum containing 1% of free $SO_3$. As soon as a neutralized sample is soluble in water, the whole is poured into ice, the precipitate is filtered and then slurried in a dilute solution of sodium hydroxide. By salting out, the dyestuff of the formula

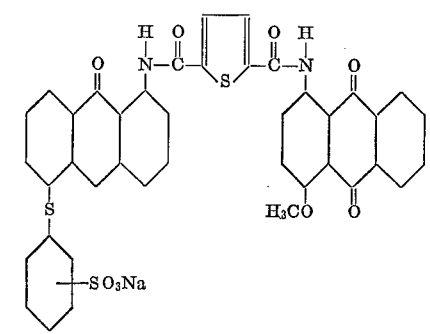

is isolated. This dyes cotton by the dyeing Process A, orange tints.

Similar dyestuffs are obtained by replacing in this example the 63 parts of 1-amino-4-methoxyanthraquinone by an equivalent quantity of 1-amino-4- or -5-benzoyl-aminoanthraquinone.

EXAMPLE 13

41 parts of 1-amino - 5 - (x'-sulfophenyl-mercapto)-anthraquinone, which is obtainable by re-crystallization of 1-amino-5-phenylmercaptoanthraquinone from monohydrate, are stirred with 16 parts of pyridine and then suspended in 800 parts by volume of nitrobenzene. After the addition of 11.3 parts of 2:4-dichloro - 6 - phenyl-triazine-1:3:5, the mixture is stirred for 3 hours at 170° C. It is then cooled, filtered, and the nitrobenzene is removed by steam-distillation. The warm residue is slurried in a dilute solution of sodium hydroxide, and then salted out to isolate the yellow dyestuff which is analogous to that described in Example 5, paragraph 2.

EXAMPLE 14

19 parts of para-mercapto-benzene-sulfonic acid are boiled for 15 hours under reflux in 750 parts of alcohol of 95% strength, with 26.8 parts of 1 - amino-5-nitro-anthraquinone in the presence of 12 parts of potassium hydroxide. After cooling, the whole is poured into water, filtered, and the sulfonic acid is isolated by salting out. The free acid is worked up in the manner described in Example 13.

EXAMPLE 15

26.8 parts of 1-amino-5-nitro-anthraquinone are stirred in 250 parts by volume of trichlorobenzene and 0.5 part of pyridine, with 24.8 parts of 4-phenylmercaptobenzoyl-chloride, for 2 hours at 150° C. After cooling, it is treated with petroleum ether, and the precipitate is filtered. The 1-nitro-5-(p'-phenylmercapto-benzoylamino)-anthraquinone so obtained is reduced in the usual manner, and the amine is acylated with iso-phthalic acid-dichloride to give the yellow dyestuff of the formula

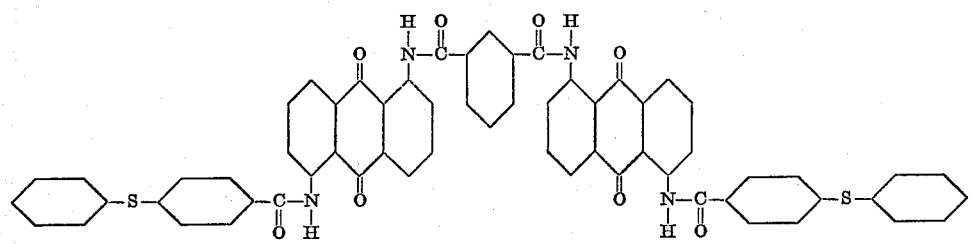

10 parts of the dried dystuff of the above formula are added to 60 parts by volume of oleum containing 1% of free SO₃, with good stirring and at a temperature within the range of 5–10° C. As soon as a neutralized sample is soluble in water, the whole is poured into 400 parts of ice, filtered, and the precipitate is slurried in an excess of a dilute solution of sodium hydroxide. By salting out, the water-soluble dyestuff, presumably corresponding to the formula

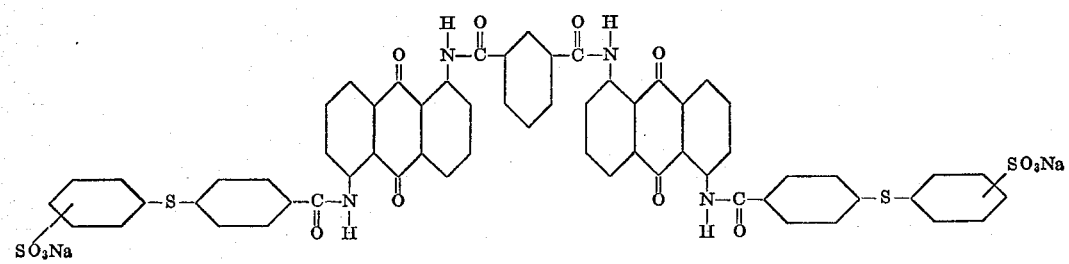

can be isolated. This dyestuff dyes cotton by the dyeing Process A, yellow tints of good properties of fastness.

By using 28 parts of 4-phenylsulfone-benzoyl-chloride instead of 24.8 parts of 4-phenylmercapto-benzoyl-chloride, a somewhat greener dyestuff is obtained.

EXAMPLE 16

17.2 parts of 2:5-thiophene-dicarboxylic acid are stirred with 26 parts of thionyl chloride, 700 parts by volume of trichlorobenzene, in the presence of 0.5 part of pyridine, for ½ hour at a temperature within the range of 125–130° C. After cooling to 90° C., 75 parts of 1-amino-5-(3'-carboxyphenylmercapto)-anthraquinone are added, and the mixture is then stirred for 3 hours at a temperature within the range of 145–150° C. After cooling, it is filtered and then washed with a small amount of trichlorobenzene followed by methanol. The yellow, water-soluble vat dyestuff so obtained has the formula

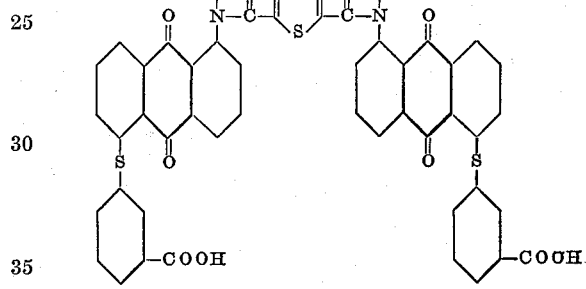

and dyes cotton by the dyeing Process A, yellow tints of very good properties of fastness.

Equally successful results are obtained by using the 1:6-, 1:7- or 1:8-derivatives instead of the 1:5-amino-(3'-carboxyphenylmercapto)-anthraquinone. The corresponding 1:4-derivative yields a red, water-soluble vat dyestuff.

Similarly, the carboxyl group may be in the para-position in the phenylmercapto radical. The thiophenedicarboxylic acid may be replaced by any desired dicarboxylic acid, or by any desired dichlorotriazine derivative.

EXAMPLE 17

40 parts of the dyestuff of the formula

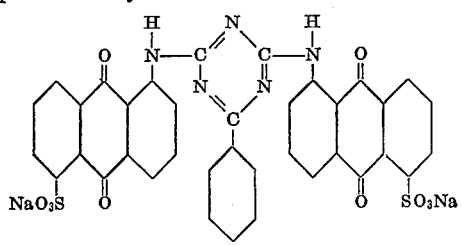

are stirred with 9 parts of 2-mercaptoethanol-1, 500 parts of water and 13.5 parts of potassium hydroxide, for 24 hours under reflux. After cooling, the mixture is acidified, and 10 parts of the dry dyestuff obtained are stirred into 60 parts of oleum containing 5% of free $SO_3$ at room temperature. As soon as a neutralized sample is soluble, in water, the whole is poured into 400 parts of ice, filtered and the precipitate is slurried in an excess of dilute sodium hydroxide solution. By salting out, the dyestuff that presumably has the formula

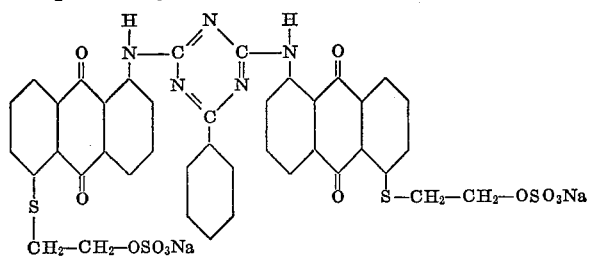

can be obtained. It dyes cotton by the dyeing Process A, yellow tints.

EXAMPLE 18

40 parts of the dyestuff of the formula

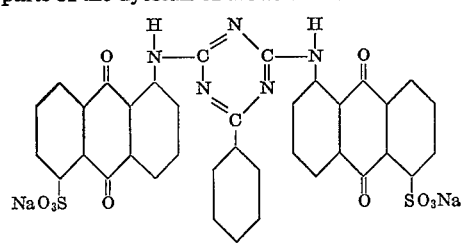

are boiled for 24 hours under reflux, with 16 parts of mercapto-ethane-sulfonic acid (obtainable from bromo-ethane-sulfonic acid and potassium hydrogensulfide) in 500 parts of water and 14 parts of potassium hydroxide. The dyestuff obtained by salting out, dyes cotton by the dyeing Process A, yellow tints.

EXAMPLE 19

31.3 parts of 1-amino-anthraquinone-6-mercapto- acetic acid (obtainable from 1-amino-anthraquinone-6-sulfonic acid and thio-glycollic acid) are stirred for 3 hours at 160° C., with 11.3 parts of 2:4-dichloro-6-phenyltriazine-1:3:5 in 400 parts by volume of trichlorobenzene in the presence of 0.5 part of pyridine. After cooling, the dyestuff of the formula

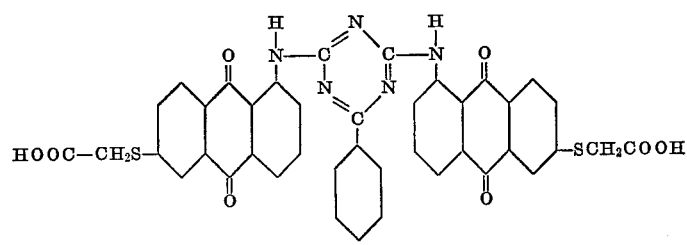

can be isolated. It dyes cotton by the dyeing Process A, yellow tints.

EXAMPLE 20

10 parts of the dry acrylamino-anthraquinone of the formula

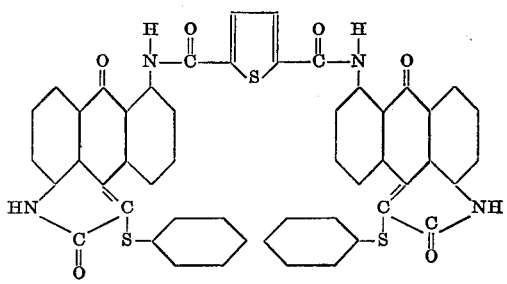

(preparable by reacting 1-amino-5-nitro-anthraquinone with thiophenylacetic acid, reduction of the nitro group and diacylation with 2:5-thiophene-dicarboxylic acid-chloride) are stirred in 70 parts by volume of oleum containing 5% of free $SO_3$, at room temperature, until a neutralized sample is soluble in water. The whole is then poured into ice, filtered and the sulfonic acid is washed with a dilute solution of common salt, and then stirred into rather more than the calculated equivalent proportion of a normal solution of sodium hydroxide. By salting out, the dyestuff, which dyes cotton by the dyeing Process A, violet tints, is obtained.

EXAMPLE 21

Into a melt consisting of 120 parts of phenol and 50 parts of potassium hydroxide are introduced 20 parts of 1-nitro-5-aminoanthraquinone and the whole is stirred for 30 minutes at 140° C. After cooling the reaction mixture, it is extracted at the boil with water, filtered, and the red residue is well washed with water. The yield of 1-amino-5-phenoxyanthraquinone is almost quantitative.

62.8 parts of the 1-amino-5-phenoxyanthraquinone so prepared are stirred for 3 hours at 160° C. with 18.4 parts of cyanuric chloride in 600 parts of dry nitrobenzene in the presence of 0.5 part of pyridine, and then for 1 hour under reflux. After cooling the reaction mixture, the ochre-coloured precipitate is isolated, washed with alcohol, and then dried.

10 parts of the dyestuff so made are sprinkled into 50 parts by volume of oleum that contains 5% of free $SO_3$ at room temperature. After 15 minutes a neutralized test portion is soluble in water. The solution is poured into ice water, filtered, and the residue is made slightly alkaline with a dilute solution of sodium hydroxide. The dyestuff of the formula

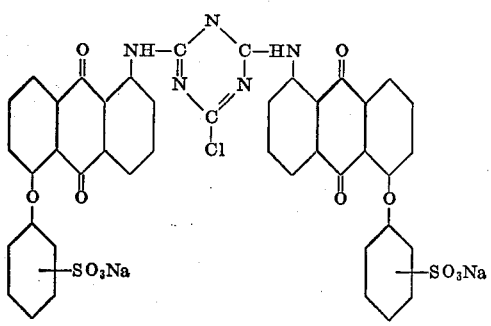

can be salted out. It dyes cotton yellow tints when applied by the usual method.

Similar dyestuffs are obtained after the same sulfonation process when, instead of 62.8 parts of 1-amino-5-phenoxyanthraquinone, there are used the anthraquinones listed in Column I of the following tables in the amounts (parts) listed in Column II. The colour obtained when the dyestuff is applied according to Dyeing Prescription A is listed in Column III.

| I | II | III |
|---|---|---|
| 1-amino-4-phenoxyanthraquinone | 62.8 | Orange. |
| 1-amino-6-phenoxyanthraquinone | 62.8 | Yellow. |
| 1-amino-7-phenoxyanthraquinone | 62.8 | Do. |
| 1-amino-8-phenoxyanthraquinone | 62.8 | Do. |
| 2-amino-5-phenoxyanthraquinone | 62.8 | Do. |
| 2-amino-6-phenoxyanthraquinone | 62.8 | Do. |
| 1-amino-5-(para-methylphenoxy)-anthraquinone | 65.8 | Golden. |
| 1-amino-5-(ortho-chlorophenoxy)-anthraquinone | 69.8 | Yellow. |
| 1-amino-4-(1-naphthoxy)-anthraquinone | 73 | Red. |
| 1-amino-4-(2-naphthoxy)-anthraquinone | 73 | Red. |
| 1-amino-5-(2-naphthoxy)-anthraquinone | 73 | Yellow. |

The various amino-phenoxy-anthraquinones and amino-naphthoxy-anthraquinones are made from the appropriate aminonitro-anthraquinones or aminohalogen-anthraquinones by a method analogous to that used for the preparation of 1-amino-5-phenoxyanthraquinone.

EXAMPLE 22

40 parts of the dyestuff of the formula

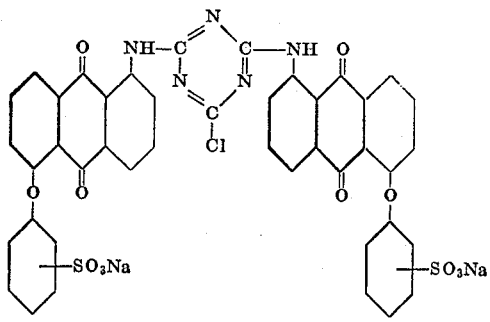

(prepared by reacting 1 mol of cyanuric chloride with 2 mols of 1-amino-5-phenoxyanthraquinone and subsequent sulfonation in oleum containing 1% of $SO_3$) are dissolved in 2000 parts by volume of water, and the pH value of the solution is adjusted to 10.9 with 50 parts by volume of 1 N-odium hydroxide solution. The whole is then stirred for 6 hours at 70 to 75° C., and the excess of sodium hydroxide is neutralized. The non-reactive, water-soluble dyestuff of the formula

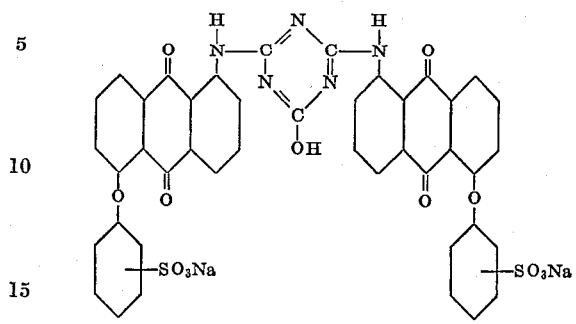

can be obtained in a quantitative yield by salting out. It dyes cotton brilliant yellow tints possessing excellent fastness to light and excellent properties of wet fastness when applied according to Dyeing Prescription A. The dyestuffs given in the table in Example 1 can also be hydrolysed under the same conditions, in which process there are obtained non-reactive but soluble vat dyestuffs that can be applied, for example, according to Dyeing Prescription A.

EXAMPLE 23

3 parts of the dyestuff described in the first two paragraphs of Example 1 are stirred for 20 hours under reflux with 2 parts of aniline in 100 parts by volume of ortho-dichlorobenzene and in the presence of 0.1 part of pyridine. After cooling the reaction mixture, it is filtered, the filter residue is washed successively with methanol and water, and is then dried in vacuo.

10 parts of the dyestuff so obtained are introduced, at room temperature, into 80 parts by volume of oleum that contains 5% of free $SO_3$. As soon as a neutralized test portion is soluble in water, the reaction mixture is poured on to ice and filtered. The residue is dissolved in a dilute solution of sodium hydroxide, and the dyestuff of the formula

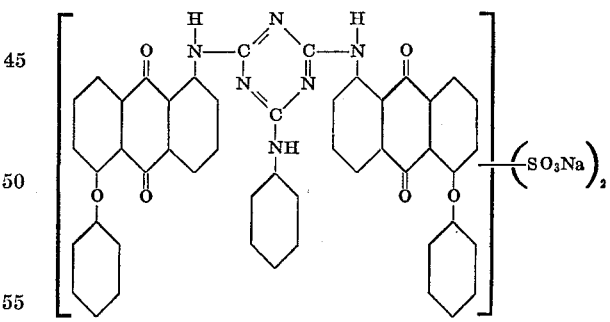

can be salted out. It dyes cotton bright yellow tints when applied according to dyeing prescription A.

EXAMPLE 24

315 parts of 1-amino-5-phenoxyanthraquinone are stirred for 3 hours at 150° C. with 102 parts of isophthalic acid dichloride in 2000 parts by volume of trichlorobenzene, 5 parts by volume of thionyl chloride and 2 parts by volume of pyridine. After cooling the reaction mixture it is filtered, the filter residue is well washed with methanol, and the dyestuff so obtained is dried in vacuo at 70° C.

10 parts of the dry dyestuff are sprinkled into 50 parts by volume of oleum that contains 5% of free $SO_3$ at room temperature. As soon as a neutralized test portion is soluble in water, the reaction mixture is poured on to 300 parts of ice. The precipitate is separated, suspended in excess dilute sodium hydroxide solution and, after the addition of sodium chloride, is filtered off. The dyestuff so obtained corresponds to the formula

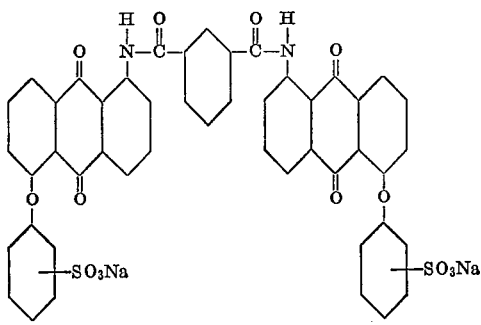

and dyes cotton yellow tints possessing excellent fastness to light and excellent properties of wet fastness when applied according to Dyeing Prescription A.

If, instead of 102 parts of isophthalic acid chloride, there are used the dicarboxylic acid chlorides listed in Column I of the following table in the amounts (parts) listed in Column II, and sulfonation is carried out by stirring in weak oleum, analogous dyestuffs are obtained that can be applied, for example, according to Dyeing Prescription A.

| I, dicarboxylic acid chloride | II, parts |
|---|---|
| Cl—CO—CO—Cl | 63.5 |
| Cl—CO—CH$_2$—CH$_2$—CO—Cl | 77.5 |
| Cl—CO—C≡C—CO—Cl | 75.5 |
| Cl—CO—C$_6$H$_4$—CO—Cl (para) | 102 |
| Cl—CO—naphthalene—CO—Cl | 126 |
| Cl—CO—C$_6$H$_4$—C$_6$H$_4$—CO—Cl | 140 |
| Cl—CO—C$_6$H$_4$—S—C$_6$H$_4$—CO—Cl | 156 |
| Cl—CO—C$_6$H$_4$—O—C$_6$H$_4$—CO—Cl | 148 |
| Cl—CO—C$_6$H$_4$—CH$_2$—C$_6$H$_4$—CO—Cl | 147 |
| Cl—CO—C$_6$H$_4$—NH—C$_6$H$_4$—CO—Cl | 148 |
| (CO—Cl)C$_6$H$_4$—N=N—C$_6$H$_4$(CO—Cl) | 153 |
| Cl—CO—C$_6$H$_4$—C$_6$H$_4$—N=N—C$_6$H$_4$—C$_6$H$_4$—CO—Cl | 229 |
| Cl—C(=N—N=C(O))—C$_6$H$_4$—CO—Cl (oxadiazole) | 217 |
| Cl—CO—thiophene—CO—Cl | 158 |
| Cl—CO—pyridine—CO—Cl | 146 |
| thianthrene—CO—Cl, Cl—CO— | 170 |
| dibenzodioxin dicarboxylic acid chloride | 154 |

The anthraquinone listed in Column I of the table given in Example 1 can also be used instead of 1-amino-5-phenoxy-anthraquinone.

The formation of the acid chloride can be carried out first, as described in Example 25, in the same reaction vessel, that is to say without it being isolated.

EXAMPLE 25

17.2 parts of thiophene-2:5-dicarboxylic acid and 16 parts by volume of thionyl chloride are stirred for 30 minutes at 130° C. in 500 parts by volume of dry nitrobenzene in the presence of 0.5 part of pyridine. The solution is cooled to 80° C. and to it are added 62.8 parts of 1-amino-5-phenoxy-anthraquinone. The whole is then stirred for 4 hours at 150° C. After cooling the reaction mixture it is filtered, the residue is washed with methanol and is then dried in vacuo at 70° C.

10 parts of the dyestuff so obtained are sprinkled, at room temperature, into 50 parts by volume of oleum that contains 5% of free SO$_3$. As soon as a neutralized test portion is soluble in water, the reaction mixture is poured into ice water, filtered, and the residue is rendered slightly alkaline with a dilute sodium hydroxide. The dyestuff of the formula

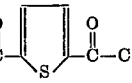

can be isolated by salting out. It dyes cellulosic fibers fast yellow tins when applied by the usual method.

EXAMPLE 26

5 parts of the dyestuff of the formula

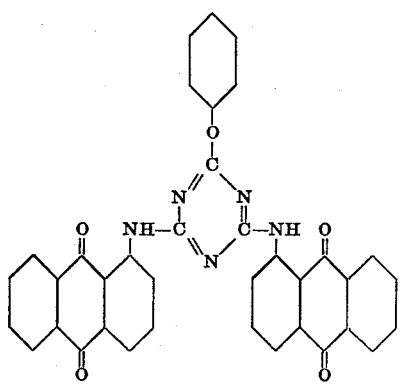

prepared from 2 moles of 1-amino-anthraquinone and 1 mole of 2:4-dichloro - 6 - phenoxy-1:3:5-triazine, are dissolved in 100 parts of oleum having an $SO_3$-content of 5% and stirred at room temperature for 2 hours. Working up is effected by pouring the reaction mixture on to ice and filtering. The product so isolated is suspended in water, neutralized with sodium hydroxide, and the resulting sulfonate is precipitated by the addition of salt.

The new dyestuff presumably corresponds to the formula

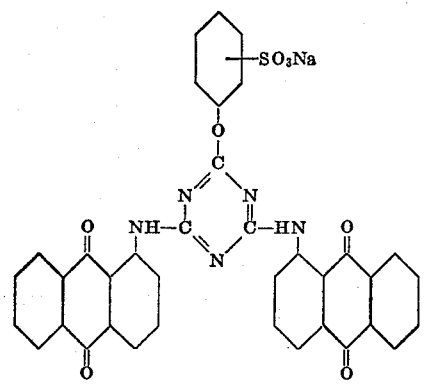

and dyes cotton yellow tints when applied according to Dyeing Prescription A.

EXAMPLE 27

12.6 parts of the dicondensation product of perylene-3:4:9:10-tetracarboxylic acid and 1-aminobenzene-3-carboxylic acid are finely pulverized, suspended in 150 parts of dry thionyl chloride and 0.5 part of pyridine. The suspension is heated for 2 hours, while stirring well, at 95 to 100° C., then for 1 hour at 130 to 135° C. and finally for 30 minutes at 170 to 175° C. The excess of thionyl chloride is distilled off in vacuo at 120° C., and 16 parts of 1-amino-4-phenoxyanthraquinone are then added to the reaction mixture. Condensation is carried out for 3 hours at 120 to 125° C., then for a further 3 hours at 140 to 145° C. and finally for 1 hour at 170° C. After cooling the reaction mixture to room temperature, it is filtered, the filter residue is washed successively with nitrobenzene and methanol, and then dried in vacuo at 90° C.

24 parts of the condensation product so obtained are introduced, at 4 to 8° C., into 400 parts of oleum of 2% strength and the whole is stirred for 1 hour. The solution is then poured on to ice, and the dyestuff acid is isolated by filtration and washed with water. The filter residue is suspended in water and the pH value is adjusted to 8.0 with a solution of sodium hydroxide. The dyestuff is isolated in the usual manner and then dried in vacuo at 80° C.

There is obtained a red-brown dyestuff powder that gives a clear solution when dissolved in water and that dyes cotton and regenerated cellulose red tins possessing very good properties of wet fastness and that exhibit excellent dyestuff penetration when applied according to Dyeing Prescription A. The dyestuff corresponds to the formula

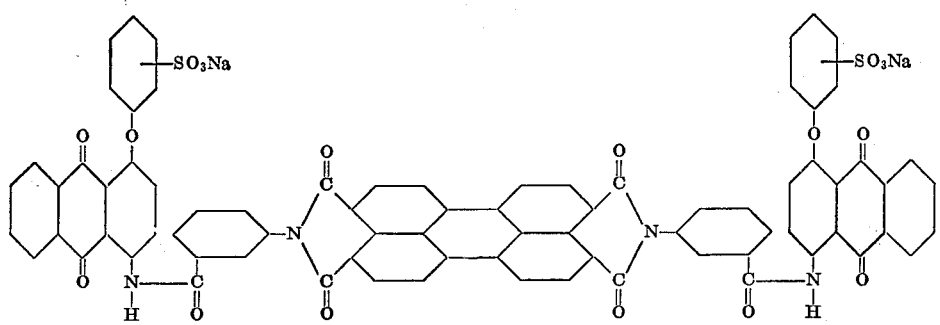

If, instead of 16 parts of 1-amino-4-phenoxy-anthraquinone, there are used 16 parts of 1-amino-5-phenoxy-anthraquinone, there is obtained a dyestuff that likewise dyes cotton red tints.

EXAMPLE 28

40 parts of 1-amino-5-(x'-sulfophenoxy)-anthraquinone (made by dissolving 1-amino-5-phenoxy-anthraquinone in mono-hydrate, pouring the solution on to a mixture of water and ice, filtering and drying) are stirred with 16 parts of pyridine and suspended in 800 parts by volume of nitrobenzene. After the addition of 11.3 parts of 24-dichloro-6-phenyltriazine-1:3:5, the whole is stirred, for 3 hours at 170° C. After cooling the reaction mixture, it is filtered and the nitrobenzene is distilled off with steam. The residue is suspended, warm, in a dilute solution of sodium hydroxide and the yellow dyestuff, that is analogous to the dyestuff described in the second paragraph of Example 4, can be isolated by salting out.

EXAMPLE 29

43 parts of 2:5-thiophene-dicarboxylic acid are stirred for 30 minutes at 130° C. with 150 parts by volume of thionyl chloride in 200 parts by volume of trichlorobenzene in the presence of 0.5 part of pyridine. The excess of thionyl chloride is distilled off, 79 parts of 1-amino-5-phenoxy-anthraquinone are added to the acid chloride solution and the whole is stirred for 1½ hours at 160° C. 63 parts of 1-amino-4-methoxyanthraquinone are then introduced into the reaction mixture and the mass is stirred for 2½ hours at 160° C. After cooling the reaction mixture, the dark red dyestuff is isolated by filtration, well washed with a small amount of trichlorobenzene and then with methanol, and then dried in vacuo at 70° C.

10 parts of the dyestuff so obtained are stirred into 60 parts by volume of oleum that contains 2% of free $SO_3$. As soon as a neutralized test portion is soluble in water, the reaction mixture is poured on to ice, the precipitate is isolated, and then suspended in a dilute solution of sodium hydroxide. The dyestuff of the formula

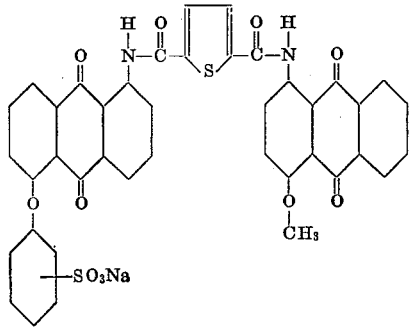

can be isolated by salting out. It dyes cotton orange tints when applied according to Dyeing Prescription A.

EXAMPLE 30

26.8 parts of 1-amino-5-nitroanthraquinone are stirred for 2 hours at 150° C. with 23.2 parts of 4-phenoxybenzoyl-chloride in 250 parts by volume of trichlorobenzene and 0.5 part of pyridine. After cooling the reaction mixture, petroleum ether is added and the precipitate is isolated. The 1-nitro-5-(para'-phenoxybenzoylamino)-anthraquinone so obtained is reduced by the usual method and the amine is acylated with isophthalic acid dichloride to form the following yellow dyestuff:

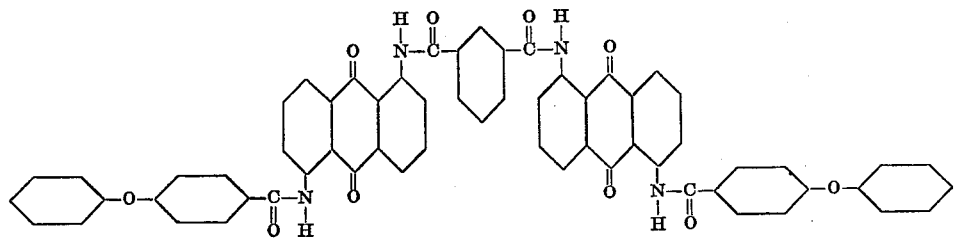

10 parts of the dry dyestuff so prepared are sprinkled, at 5 to 10° C., while stirring well, into 60 parts by volume of oleum that contains 2% of free SO$_3$. As soon as a neutralized test portion is soluble in water, the reaction mixture is poured on to 400 parts of ice, filtered, and the precipitate is suspended in excess dilute sodium hydroxide solution. The water-soluble dyestuff of the formula

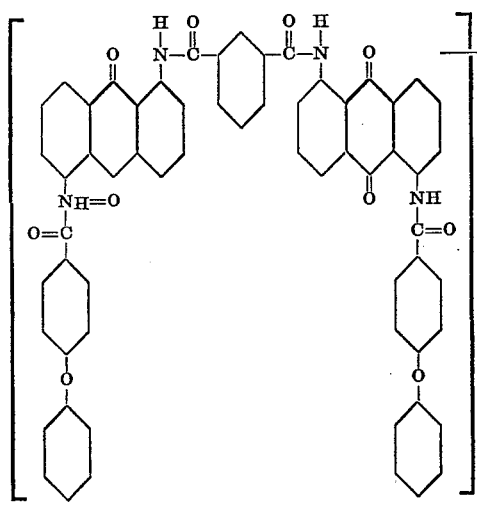

can be isolated by salting out. It dyes cotton yellow tints possessing good properties of fastness when applied according to Dyeing Prescription A.

EXAMPLE 31

17.2 parts of 2:5-thiophenedicarboxylic acid are stirred for 30 minutes at 125 to 130° C. with 26 parts of thionyl chloride in 700 parts by volume of trichlorobenzene in the presence of 0.5 part of pyridine. After cooling the reaction mixture to 90° C., 72 parts of 1-amino-5-(3'-carboxyphenoxy)-anthraquinone are added, and the whole is then stirred for 3 hours at 145 to 150° C. After cooling the reaction mixture, it is filtered, the residue is washed with a small amount of trichlorobenzene and then with methanol. The water-soluble yellow vat dyestuff of the formula

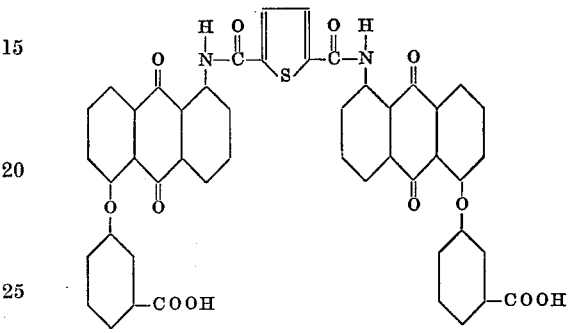

so prepared dyes cotton yellow tints possessing very good properties of fastness when applied according to Dyeing Prescription A.

Instead of 1 - amino-5-(3'-carboxyphenoxy)-anthraquinone, there can be used with equal success the 1:6, 1:7, and 1:8 derivatives. The corresponding 1:4 derivative yields a red water-soluble vat dyestuff.

The carboxy group of the phenoxy residue can also be in ortho- or para-position when the appropriate anthraquinone derivative is used as starting material.

The thiophenedicarboxylic acid can be replaced by any dicarboxylic acid or any dichlorotriazine derivative.

Dyeing Process A 0.15 part of the dyestuff obtained in Example 1, is added to 50 parts of water, and then poured into a solution of 2 parts by volume of sodium hydroxide of 36° Bé. and 1.2 part of hydrosulfite in 350 parts of water, at 60° C. 10 parts of cotton are dyed for 45 minutes in the dye bath so obtained, with the addition of 12 parts of sodium chloride, the temperature being allowed to rise to 80° C. After dyeing, it is rinsed in running cold water until it has been exhaustively oxidized, and then acidified and soaped at the boil. A bright golden-yellow dyeing is obtained that has excellent properties of fastness.

Dyeing Process B 0.3 part of the dyestuff obtained in Example 5 is dissolved in 50 parts by volume of water at 60° C., and the solution is poured into a solution at 50° C. containing 1 part by volume of a solution of sodium hydroxide of 36° Bé. and 0.7 part of sodium hydrosulfite in 350 parts by volume of water. 10 parts of silk are dyed for 45 minutes in the dye bath so obtained, at 50° C., with the addition of two lots of 6 parts of common salt. After the dyeing, the material is rinsed in running cold water until it has been completely oxidized, then acidified with acetic acid and finally soaped at the boil. A golden-yellow dyeing is obtained of excellent properties of fastness.

What is claimed is:

1. The product obtained by sulfonating at room temperature with oleum of 1 to 10% free sulfur trioxide an anthraquinone dyestuff of the formula

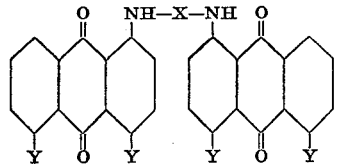

or

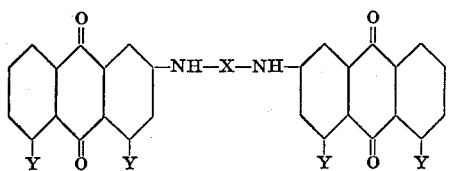

wherein at least one and at most two of the symbols Y are for a phenoxy-, naphthoxy-, benzyloxy-, benzylmercapto, phenylmercapto- or naphthylmercapto group, the others being for hydrogen and X is a member selected from the group consisting of the diacyl radical of lower aliphatic, benzene, naphthalene, diphenyl-, diphenylsulfide, diphenyloxide, diphenylsulfone and diphenylmethane dicarboxylic acids bound to the two NH— bridges by their

groups, provided that when two of the symbols Y are other than hydrogen they are on different anthraquinone rings and in corresponding positions.

2. The product obtained according to claim 1 by sulfonating an anthraquinone dyestuff of the formula

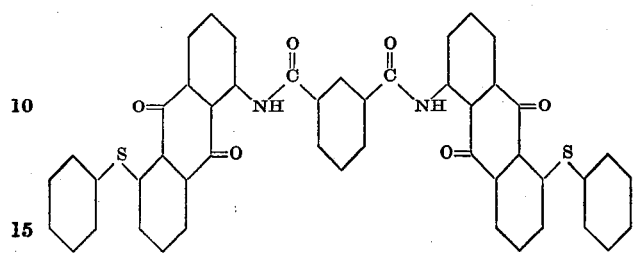

References Cited
UNITED STATES PATENTS

| | | | |
|---|---|---|---|
| 1,911,714 | 6/1933 | Rosch | 260—368 |
| 2,845,443 | 7/1958 | Hindermann et al. | 260—373 |
| 2,870,172 | 1/1959 | Schoenauer | 260—368 |
| 3,183,224 | 5/1965 | Benz et al. | 260—373 |

FOREIGN PATENTS

| | | | |
|---|---|---|---|
| 844,756 | 4/1939 | France | 260—368 |

LEWIS GOTTS, Primary Examiner

E. J. SKELLY, Assistant Examiner

U.S. Cl. X.R.

8—39, 40; 260—192, 207.1, 249, 256.5 R, 257, 261, 272, 276, 278, 294.8 B, 307.5, 312, 327 P, 329.2, 340.3, 347.2, 351, 360, 363